US010592863B2

(12) United States Patent
Hariton

(10) Patent No.: US 10,592,863 B2
(45) Date of Patent: *Mar. 17, 2020

(54) METHOD AND APPARATUS FOR REMOTE REAL TIME CO-AUTHORING OF INTERNET BASED MULTIMEDIA COLLABORATIVE PRESENTATIONS

(71) Applicant: Nicholas T. Hariton, Los Angeles, CA (US)

(72) Inventor: Nicholas T. Hariton, Los Angeles, CA (US)

(*) Notice: Subject to any disclaimer, the term of this patent is extended or adjusted under 35 U.S.C. 154(b) by 356 days.

This patent is subject to a terminal disclaimer.

(21) Appl. No.: 15/704,201

(22) Filed: Sep. 14, 2017

(65) Prior Publication Data
US 2018/0060817 A1    Mar. 1, 2018

Related U.S. Application Data

(60) Continuation of application No. 12/939,369, filed on Nov. 4, 2010, now Pat. No. 9,792,584, which is a
(Continued)

(51) Int. Cl.
*G06Q 10/10* (2012.01)
*G06Q 50/18* (2012.01)
(Continued)

(52) U.S. Cl.
CPC ............. *G06Q 10/10* (2013.01); *G06Q 50/18* (2013.01); *H04L 29/06027* (2013.01); *H04L 67/10* (2013.01)

(58) Field of Classification Search
CPC combination set(s) only.
See application file for complete search history.

(56) References Cited

U.S. PATENT DOCUMENTS 4,479,195 A    10/1984 Herr et al.
4,616,327 A    10/1986 Rosewarne et al.
(Continued)

FOREIGN PATENT DOCUMENTS

CA    2253867 A1    11/1997
EP    1579654 B1    2/2010
(Continued)

OTHER PUBLICATIONS

Large Screen Displays (name of company); Pi Projected Images Touch Screen Bezels (name of product); Jul. 13, 2004; 1 pg.; Santa Ana, CA 92704.
(Continued)

*Primary Examiner* — Sherief Badawi
*Assistant Examiner* — Wendy Nicholas
(74) *Attorney, Agent, or Firm* — Pritzkau Patent Group LLC

(57) ABSTRACT

A method for preparing a presentation connects a plurality of geographically dispersed contributors to a controller through a network to collaborate to prepare the presentation, allows the contributors to propose contributions to the presentation residing on storage devices under the control of the contributors, makes the proposed contributions available for viewing and comment by all contributors, allows the controller to select one or more of the proposed contributions, and provides the controller access through the network to the storage devices to retrieve the selected contributions for inclusion into the presentation.

45 Claims, 6 Drawing Sheets

Related U.S. Application Data continuation of application No. 11/462,358, filed on Aug. 3, 2006, now abandoned, which is a division of application No. 09/881,133, filed on Jun. 14, 2001, now abandoned.

(60) Provisional application No. 60/211,912, filed on Jun. 16, 2000.

(51) Int. Cl.
*H04L 29/06* (2006.01)
*H04L 29/08* (2006.01)

(56) References Cited

U.S. PATENT DOCUMENTS

| | | |
|---|---|---|
| 4,695,975 A | 9/1987 | Bedrij |
| 4,766,581 A | 8/1988 | Korn et al. |
| 4,864,516 A | 9/1989 | Gaither et al. |
| 4,876,657 A | 10/1989 | Saito et al. |
| 4,905,094 A | 2/1990 | Pocock et al. |
| 4,949,300 A | 8/1990 | Christenson et al. |
| 4,962,475 A | 10/1990 | Hernandez et al. |
| 5,008,853 A | 4/1991 | Bly et al. |
| 5,072,412 A | 12/1991 | Henderson, Jr. et al. |
| 5,093,907 A | 3/1992 | Hwong et al. |
| 5,119,188 A | 6/1992 | McCalley et al. |
| 5,119,474 A | 6/1992 | Beitel et al. |
| 5,204,768 A | 4/1993 | Tsakiris et al. |
| 5,220,657 A | 6/1993 | Bly et al. |
| 5,245,553 A | 9/1993 | Tanenbaum |
| 5,247,615 A | 9/1993 | Mori et al. |
| 5,293,619 A | 3/1994 | Dean |
| 5,303,042 A | 4/1994 | Lewis et al. |
| 5,307,055 A | 4/1994 | Buskin et al. |
| 5,379,374 A | 1/1995 | Ishizaki et al. |
| 5,446,842 A | 8/1995 | Schaeffer et al. |
| 5,448,263 A | 9/1995 | Martin |
| 5,473,744 A * | 12/1995 | Allen ............... G09B 5/065 |
| | | 715/273 |
| 5,539,658 A | 7/1996 | McCullough |
| 5,577,188 A | 11/1996 | Zhu |
| 5,581,760 A | 12/1996 | Atkinson |
| 5,608,872 A | 3/1997 | Schwartz et al. |
| 5,617,539 A | 4/1997 | Ludwig et al. |
| 5,623,603 A | 4/1997 | Jiang et al. |
| 5,649,104 A | 7/1997 | Carleton et al. |
| 5,664,126 A | 9/1997 | Hirakawa |
| 5,671,428 A | 9/1997 | Muranaga et al. |
| 5,758,110 A | 5/1998 | Boss et al. |
| 5,781,727 A | 7/1998 | Carleton et al. |
| 5,781,732 A | 7/1998 | Adams |
| 5,815,392 A | 9/1998 | Bennett et al. |
| 5,822,525 A | 10/1998 | Tafoya et al. |
| 5,864,711 A | 1/1999 | Mairs et al. |
| 5,874,960 A | 2/1999 | Mairs et al. |
| 5,890,177 A | 3/1999 | Moody et al. |
| 5,907,704 A | 5/1999 | Gudmundson |
| 5,915,091 A | 6/1999 | Ludwig et al. |
| 5,944,791 A | 8/1999 | Scherpbier |
| 5,948,022 A | 9/1999 | Carelton et al. |
| 5,960,448 A | 9/1999 | Reichek et al. |
| 5,974,446 A | 10/1999 | Sonnenreich et al. |
| 5,978,835 A | 11/1999 | Ludwig et al. |
| 5,983,263 A | 11/1999 | Rothrock et al. |
| 6,002,398 A | 12/1999 | Wilson |
| 6,088,702 A | 7/2000 | Plantz et al. |
| 6,091,408 A | 7/2000 | Treibitz et al. |
| 6,121,968 A | 9/2000 | Arcuri et al. |
| 6,128,629 A * | 10/2000 | Bretschneider ......... G06F 16/10 |
| 6,167,432 A | 12/2000 | Jiang |
| 6,182,123 B1 | 1/2001 | Filepp et al. |
| 6,199,082 B1 | 3/2001 | Ferrel et al. |
| 6,216,177 B1 | 4/2001 | Mairs et al. |
| 6,230,171 B1 | 5/2001 | Pacifici et al. |
| 6,237,025 B1 | 5/2001 | Ludwig et al. |
| 6,285,363 B1 | 9/2001 | Mairs et al. |
| 6,308,327 B1 | 10/2001 | Liu |
| 6,351,776 B1 | 2/2002 | O'Brien et al. |
| 6,396,500 B1 | 5/2002 | Qureshi et al. |
| 6,437,776 B1 | 8/2002 | Walz |
| 6,532,218 B1 | 3/2003 | Shaffer et al. |
| 6,570,590 B1 | 5/2003 | Dubrow et al. |
| 6,598,075 B1 | 7/2003 | Ogdon et al. |
| 6,601,087 B1 | 7/2003 | Zhu et al. |
| RE38,284 E | 10/2003 | Allen et al. |
| 6,631,404 B1 | 10/2003 | Philyaw |
| 6,643,663 B1 | 11/2003 | Dabney et al. |
| 6,654,032 B1 * | 11/2003 | Zhu ..................... G06Q 10/10 |
| | | 709/204 |
| 6,675,216 B1 | 1/2004 | Quatrano et al. |
| 6,684,211 B1 | 1/2004 | Nguyen |
| 6,687,878 B1 | 2/2004 | Eintracht et al. |
| 6,711,378 B2 | 3/2004 | Kashima |
| 6,728,753 B1 | 4/2004 | Parasnis et al. |
| 6,728,784 B1 * | 4/2004 | Mattaway ........... H04L 12/1822 |
| | | 370/260 |
| 6,748,420 B1 | 6/2004 | Quatrano et al. |
| 6,778,972 B2 | 8/2004 | Leonardos |
| 6,810,382 B1 | 10/2004 | Wamsley et al. |
| 6,826,595 B1 | 11/2004 | Zhu et al. |
| 6,911,987 B1 | 6/2005 | Mairs et al. |
| 6,948,131 B1 | 9/2005 | Neven et al. |
| 7,047,241 B1 | 5/2006 | Erickson |
| 7,127,486 B1 | 10/2006 | Reistad et al. |
| 7,130,883 B2 | 10/2006 | Zhu et al. |
| 7,133,896 B2 | 11/2006 | Ogdon et al. |
| 7,143,177 B1 | 11/2006 | Johnson et al. |
| 7,203,755 B2 | 4/2007 | Zhu et al. |
| 7,240,287 B2 | 7/2007 | Qureshi et al. |
| 7,299,405 B1 | 11/2007 | Lee et al. |
| 7,328,239 B1 | 2/2008 | Berberian et al. |
| 7,373,381 B2 | 5/2008 | Rust |
| 7,461,347 B2 | 12/2008 | Zhu et al. |
| 7,490,169 B1 | 2/2009 | Ogdon |
| 7,523,163 B2 | 4/2009 | Zhu et al. |
| 7,533,146 B1 | 5/2009 | Kumar |
| 7,546,602 B2 | 6/2009 | Hejlsberg |
| 7,552,228 B2 | 6/2009 | Parasnis et al. |
| 7,558,402 B2 | 7/2009 | Zhou et al. |
| 7,590,688 B2 | 9/2009 | Franke |
| 7,669,183 B2 | 2/2010 | Bowman et al. |
| 8,204,935 B2 | 6/2012 | Vernon et al. |
| 8,473,835 B2 | 6/2013 | Hariton |
| 8,548,861 B2 | 10/2013 | Buonanno et al. |
| 8,683,328 B2 | 3/2014 | Nguyen |
| 2001/0000811 A1 | 5/2001 | May et al. |
| 2001/0030667 A1 | 10/2001 | Kelts |
| 2002/0002562 A1 | 1/2002 | Moran et al. |
| 2002/0019845 A1 | 2/2002 | Hariton |
| 2002/0059293 A1 | 5/2002 | Hirsch |
| 2002/0065885 A1 | 5/2002 | Buonanno et al. |
| 2002/0069099 A1 | 6/2002 | Knox et al. |
| 2002/0069405 A1 | 6/2002 | Chapin |
| 2002/0085030 A1 | 7/2002 | Ghani |
| 2002/0089470 A1 | 7/2002 | Raman |
| 2002/0112180 A1 | 8/2002 | Land et al. |
| 2002/0120925 A1 | 8/2002 | Logan |
| 2003/0009603 A1 | 1/2003 | Ruths et al. |
| 2003/0011636 A1 | 1/2003 | Feroglia |
| 2003/0014513 A1 | 1/2003 | Ruths et al. |
| 2003/0018719 A1 | 1/2003 | Ruths et al. |
| 2003/0043185 A1 | 3/2003 | Kake |
| 2003/0118167 A1 | 6/2003 | Sammon et al. |
| 2003/0120729 A1 | 6/2003 | Kim et al. |
| 2003/0217336 A1 | 11/2003 | Gounares |
| 2004/0008180 A1 | 1/2004 | Appling |
| 2004/0012613 A1 | 1/2004 | Rast |
| 2004/0030741 A1 | 2/2004 | Wolton |
| 2004/0034543 A1 | 2/2004 | Bartsch |
| 2004/0046798 A1 | 3/2004 | Alen |
| 2004/0048646 A1 | 3/2004 | Visocnik |
| 2004/0095378 A1 | 5/2004 | Vigue et al. |
| 2005/0027896 A1 | 2/2005 | Mairs et al. |

(56) References Cited

U.S. PATENT DOCUMENTS

| | | |
|---|---|---|
| 2005/0050462 A1 | 3/2005 | Whittle |
| 2005/0073506 A1 | 4/2005 | Durso |
| 2005/0131924 A1 | 6/2005 | Jones |
| 2005/0216847 A1 | 9/2005 | Zhu et al. |
| 2006/0064643 A1 | 3/2006 | Hariton |
| 2007/0028177 A1 | 2/2007 | Hariton |
| 2007/0168426 A1 | 7/2007 | Ludwig et al. |
| 2008/0253608 A1 | 10/2008 | Long |
| 2011/0106716 A1 | 5/2011 | Hariton |
| 2013/0254665 A1 | 9/2013 | Hariton |

FOREIGN PATENT DOCUMENTS

| | | |
|---|---|---|
| WO | WO1997042728 A2 | 2/1998 |
| WO | WO 0062220 A1 | 10/2000 |

OTHER PUBLICATIONS

Moreau, Dennis R., "The USL NASA PC R&D Interactive Presentation Development System", National Technical Information Services (Baltimore) Report No. N8914979, pp. 1-8, Aug. 1984.

Amir, Arnon, et al,. "Automatic Generation of Conference Video Proceedings", Journal of Visual Communication and Image Representation, vol. 15, Issue 3, Academic Press Inc., Sep. 2004.

Scott Elrod et al., Liveboard: A Large Interactive Display Supporting Group Meetings, Presentations and Remote Collaboration, May 3, 1992, Association for Computing Machinery.

Binjia Jiao, Multimedia Presentation Database System, ACM Multimedia 2000, Nov. 2000, Los Angeles, CA.

Optical Magnetic Imaging Corporation, Interactive Presentation System User's Manual, Ver. 2.20, Jan. 1993, Optical Magnetic Imaging Corporation.

Rutledge, Patrice-Anne, "Adding Movies and Sound", Using Microsoft PowerPoint 2000, Indianapolis, Ind: Que, 1999. Chapter 13, EBSCOhost, Web. <http://ehis.ebscohost.com/.

Camarda, Bill, "Using Microsoft Word 2000", United States: Que, 1999, Chapter 24, Safari Books Online. Web. <http://techbus.safaribooksonline.com/book/office-and-productivity-applications/0789718529.

Fuller, Robert C., "Working with Web Scripts", Using Microsoft PowerPoint 2000, Indianapolis, Indiana, Que, 1999. Chapter 16, pp. 368, 381-382.

Rutledge, Patrice-Anne, "Using Online Broadcasts and Meetings", Using Microsoft PowerPoint 2000, Indianapolis, Indiana, Que, 1999, Chapter 17, pp. 384 and 404-405.

\* cited by examiner

Actor

Use Case

METHOD AND APPARATUS FOR REMOTE REAL TIME CO-AUTHORING OF INTERNET BASED MULTIMEDIA COLLABORATIVE PRESENTATIONS

RELATED APPLICATIONS

The present application is a continuation application of copending U.S. patent application Ser. No. 12/939,369 filed on Nov. 4, 2010; which is a continuation of U.S. patent application Ser. No. 11/462,358 filed on Aug. 3, 2006, now abandoned; which is a divisional of U.S. patent application Ser. No. 09/881,133 filed on Jun. 14, 2001, now abandoned, which claims the priority of U.S. Provisional Patent Application Ser. No. 60/211,912, filed Jun. 16, 2000; the disclosures of which are incorporated herein by reference.

BACKGROUND OF THE INVENTION

Field of the Invention

The present invention relates to a method of doing business providing litigation services and in particular to a method of doing business preparing multimedia presentations scripts by providing a virtual scripting room allowing a plurality of remotely located participants to contribute concurrently to the presentation script.

Description of the Prior Art

To prepare a multimedia presentation, the sources (individuals or documents) must be in the same physical location as the scripting technician (the "Scripting Room"). Within the context of a lawsuit, for example (and as shown in FIG. 1), a trial consultant or technician ("Operator" or controller), meets with one or more attorneys, witnesses and/or experts ("Clients" or contributors) in the Scripting Room and together they utilize multimedia software to create a scripted presentation (a "Script") of evidence relating to a specific witness or the opening/closing of a trial. Software for creating such a scripted presentation is disclosed in U.S. Pat. No. 5,473,744, which is incorporated herein in its entirety by reference. As an alternative, the Clients may provide the Operator an outline of an examination, opening statement, or closing statement.

In the Scripting Room, the Operator creates a script corresponding to the outline. A physical scripting room as currently utilized in the art may include Clients 11 and 12 working with an Operator 10 (trial consultant or technician) to script a multimedia presentation. The Operator utilizes multimedia software and data source material on a CPU 14 and associated display monitor 15, which the Clients (and the Operator) view on a large screen display 16 linked to the Operator's CPU.

Regardless of how the Script is initiated, the Clients and the Operator still must physically meet to review the Script and work together in the Scripting Room to make final revisions to the Script. This entails synchronizing the schedules of potentially a large number of persons, and will typically involve the additional expense and effort of travel.

SUMMARY OF THE INVENTION

The present invention offers a solution to this problem by providing, in one aspect, a method and system for preparing a presentation, comprising connecting a plurality of geographically dispersed contributors to a controller through a network to collaborate to prepare the presentation; allowing the contributors to propose contributions to the presentation, the proposed contributions residing on storage devices under the control of the contributors; making the proposed contributions available for viewing and comment by all contributors; allowing the controller to select one or more of the proposed contributions; and providing the controller access through the network to the storage devices to retrieve the selected contributions for inclusion into the presentation.

In a further aspect, the present invention provides a method and system for making a presentation wherein selected contributions are retrieved from respective storage devices immediately prior to displaying the selected contribution. In a yet further aspect, the invention provides a method and system for making a presentation that includes providing access through a network to view the presentation while the presentation is being made.

DETAILED DESCRIPTION OF THE INVENTION

Figure 1:
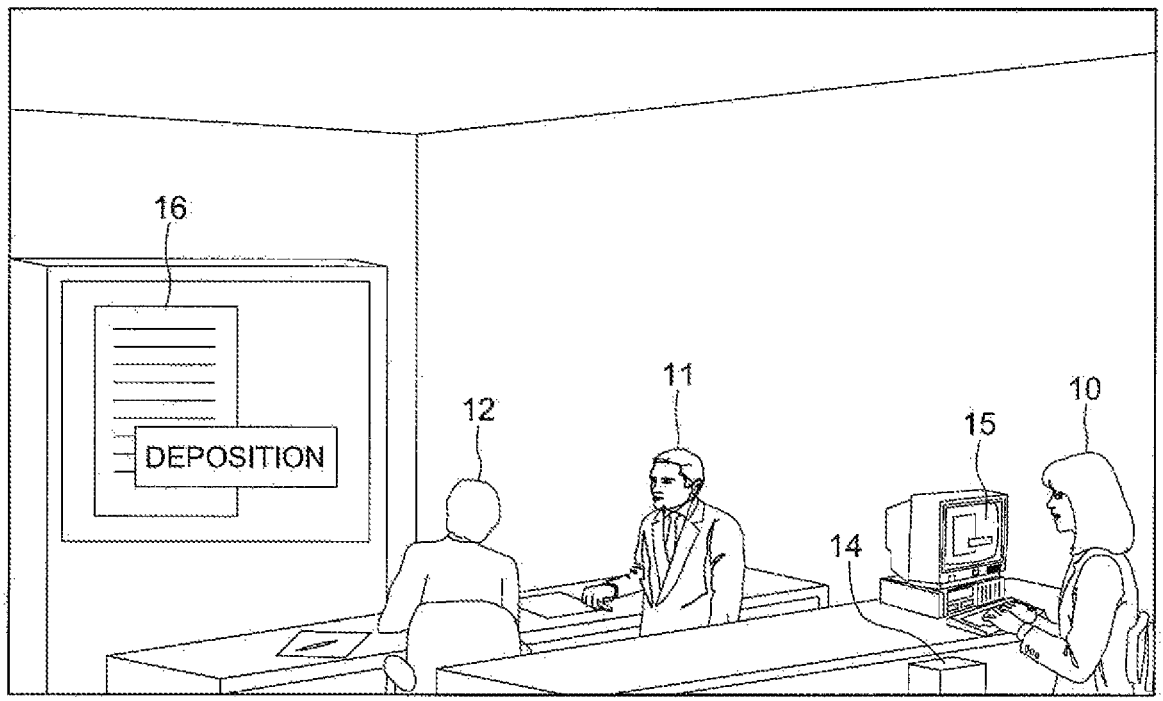
FIG. 1 is a view of a typical Scripting Room as known in the art.
Figure 2:
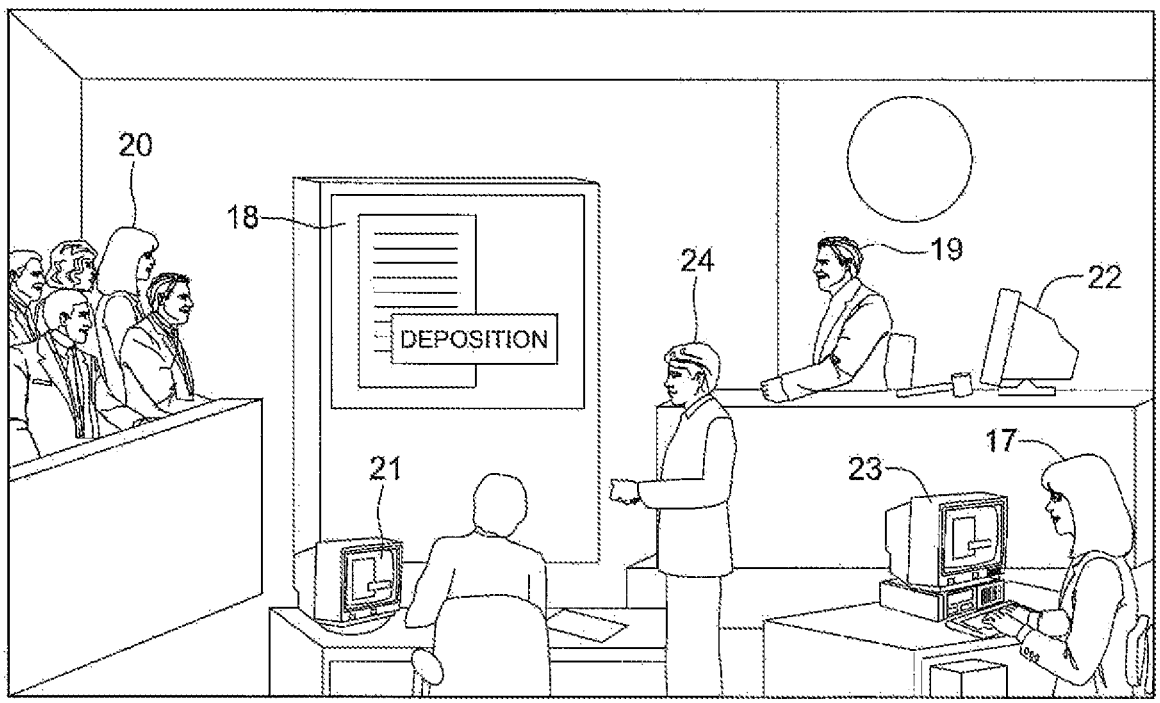
FIG. 2 is a view of a typical court room in which the presentation prepared in the Scripting Room is displayed, as known in the art.

With reference to the previous example of a presentation prepared within the context of a lawsuit, FIG. 2 depicts a typical courtroom in which the presentation Script would be displayed to enhance the effective presentation of visual evidence (documents, video taped depositions, photographs, etc.) and ultimately to assist the presenting attorney to control juror focus. The Operator 17 is utilizing multimedia software to display the Script and associated data source material from her CPU and associated hard drives at the direction of the speaking attorney 24. The Script is displayed on a conveniently positioned large screen display 18 to both the judge 19 and the jury 20. In addition, there are display devices on counsel table 21, in front of the judge 22, in front of the witness (not shown), and in front of the Operator 23.

Common terms used throughout the specification are defined as follows. A Script is a series of presentation segments that will be used during a trial. A Segment is a logically grouped set of graphical components that make up a single element of a script. Using a variety of windows on the screen's real estate, a Segment may integrate animation, video deposition segments, live action video, graphics, document images, text, and any other type of information that may be visually displayed. An Exhibit is a collection of files that will be used for display as a single entity. For example, several TIFF files may be placed in an exhibit. A Case is a unit used to identify a group of scripts. The main office refers to the physical facility where the Operator is located as well as the entity (e.g. the business entity) that control this facility and the Operator.

Figure 3:
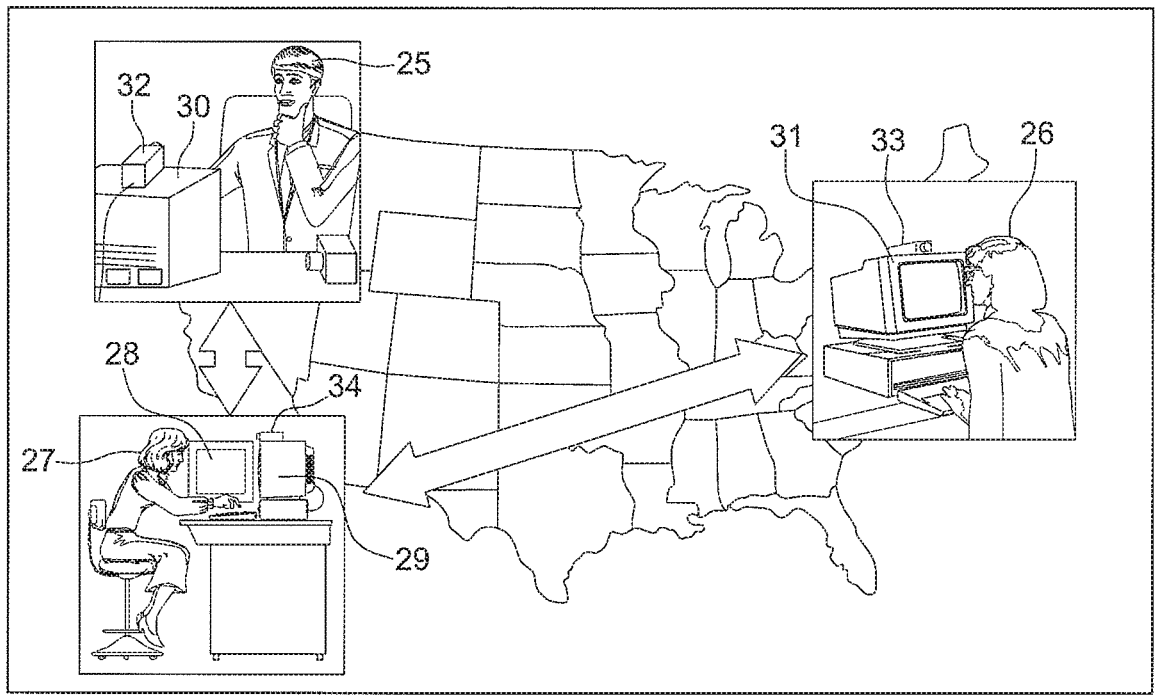
FIG. 3 is a diagram illustrating distributed scripting according to the invention.

With reference to the drawings, and as further described in detail elsewhere in the specification, in one aspect of the present invention a Distributed Scripting method is provided whereby the physical Scripting Room is replaced by a virtual one ("Virtual Scripting Room"). As shown in FIG. 3, in the Distributed Scripting method of the invention the Operator and the scripting computer are located in the Scripting Room, while the Clients may be situated in their offices wherever located. The Operator and the Clients are in effect together in the Virtual Scripting Room connected by the Internet (or directly connected via Intranet, fiber optic cable, satellite, ISDN or other high-speed transmission line). The connection may either be in real time or the Clients may time shift.

The scripting computer executes software that enables communication between the Operator and the various clients, as well as the development of the Script itself. The interactive nature of the software facilitates time shifting and collaboration in general. Elements of the Script (video, documents, graphics and text) are streamed between the Operator and the Clients. Each Client has the ability to utilize the software's tools to modify existing script segments, to create new script segments, and to append comments to any scripted segment. The revisions are stored with a Script as temporary script segments identified by creator and revision number (example: Client Able working on script segment 6 first revision: Segment 6A-1; second revision: 6A-2; etc.). However, only the changes made or accepted by the Operator become final in a Script. The Operator may view a single script segment, all of its renditions, and its modifications and comments simultaneously as thumbnails sized proportionally to fill the screen, and may open and activate each by a left mouse click. The Virtual Scripting Room may be equipped with video teleconferencing running on each Client's monitor and on a second monitor for the Operator.

With further reference to FIG. 3, Clients 25 and 26 are shown working with an Operator 27 (trial consultant or technician) to script a multimedia presentation in the Virtual Scripting Room. For this example of Distributed Scripting, Client 25 is located in his office in the State of Washington, while Client 26 is located in the City of New York. The Operator is located in the Los Angeles Scripting Room. Each of the CPUs of the Clients and the Operator are connected over the Internet (or directly connected via Intranet, fiber optic cable, satellite, ISDN or other high-speed transmission line). The Operator is utilizing two display devices: a monitor 28 to show script segments, suggested revisions, suggested new segments and notes from the Clients, and another monitor 29 to provide the visual image of the Clients to the Operator via video teleconferencing. The Operators CPU includes a storage device (not shown) as is known in the art (e.g. hard drive, cd-rom, zip drive, tape drive) for storing the presentation and any segments contributed by the Clients. The Clients are able to view the scripted segments and the work in progress on their respective display devices 30 and 31. They may also able to view the real time image of the Operator on their display devices, when each Client and the Operator have digital video cameras for video teleconferencing 32, 33 and 34.

All Clients may make changes to the Script, but only the Operator has the ability to save the Script and thus the final authority on the form and components of the final Script. The Operator, and/or an Application Administrator, can confer such privileges upon some of the Clients. A Client may also choose to work independently on a working copy of the Script, and may save this working copy independently of the final copy, and may further provide this working copy for review by the other Clients and the Operator for possible incorporation into the final Script. As the Clients make changes to the Script, each Client's actions are saved in a log for later recall and accountability.

To further facilitate Distributed Scripting, the method of the invention includes the ability to utilize data source material (Image, Video, Audio, Text, CAD and Graphic Files) located outside of the Scripting Room. The software may enable this feature by tracking and storing in a Script the complete path, including access codes, to each data source element. Each Client in the Virtual Scripting Room may contribute data source material either by scripting such material or providing the Operator access to such Client's hard drives or other media storage devices (cd-rom drives, zip drives, optical drives, tape drives, magneto-optical drives, etc.). This feature is particularly suited to utilizing data stored in Internet based repositories, such as FTP servers or on "Internet hard drives" such as those provided by Xdrive, i-drive, and others. Of course, any storage device connected to the same network as the Clients and Operator may be used to supply data for inclusion into the Script.

Each individual component of any one segment may thus be remotely located on a different storage device. In this embodiment, the Script contains a path for each component of each segment, so that the Script is completely portable and does not rely on default paths or storage devices that must be connected to the computer upon which the Script is being executed (such as a computer in the court room). Thus, data supplied by the Clients for inclusion into the Script may be transferred to the scripting computer for local storage together with the Script, and upon displaying the presentation, the data is available locally on the same computer as the Script. Alternatively, the data may be transferred 'on-the-fly' from the original source when displaying the presentation, without the need of first saving the data on the computer on which the presentation Script is being executed. This features offers additional flexibility in incorporating last-minute changes in the presentation while actually displaying the presentation, and eliminates the need for downloading and locally storing all data that may possibly be required during the presentation.

Figure 4:
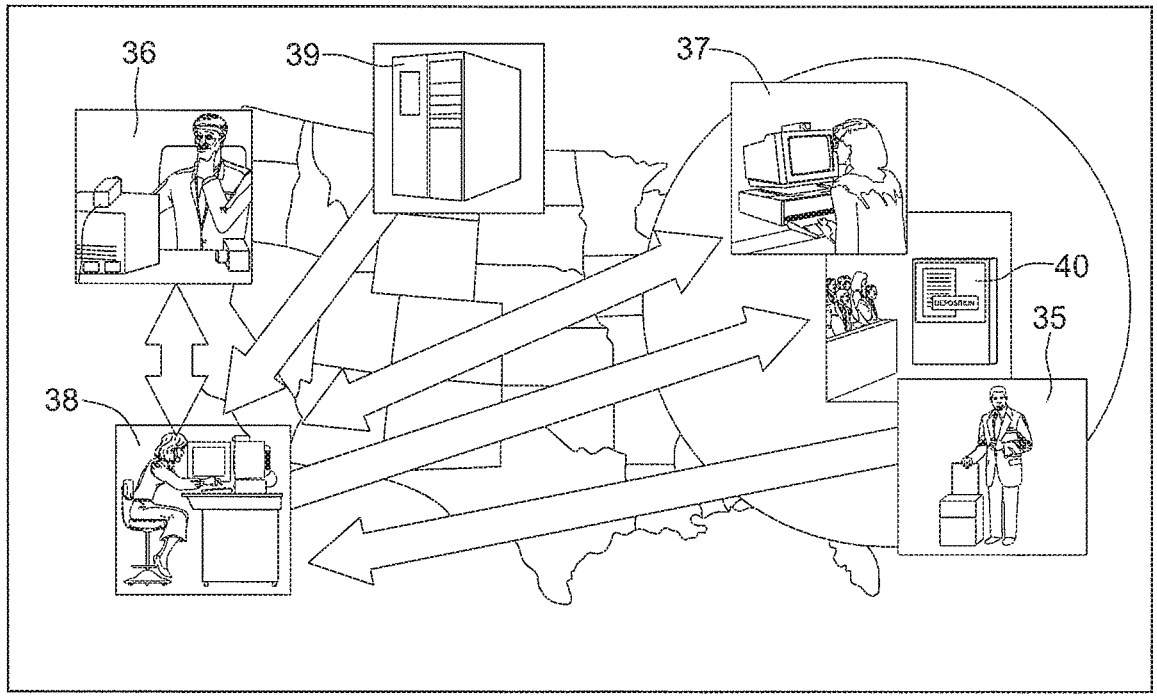
FIG. 4 is another diagram illustrating distributed scripting according to the invention.

The Distributed Scripting methodology provided by the present invention enables delivery of trial presentation services from a single main office to clients nationwide and worldwide. The delivery of worldwide services may be further facilitated by the use of regional service providers (each a "Local Provider") as depicted in FIG. 4. Each Local Provider may not only provide local support, but may also source regional litigation clients. Typically, Local Providers would be litigation photocopy companies with the ability to scan and create document images, but could be any type of litigation support entity, including court reporters. Digital video and other graphics may be created regionally or in the main office. The Local Provider would gather the source data and provide it to the main office either physically or electronically. The Local Provider may also provide Clients with a remote scripting facility linked over the Internet to the Virtual Scripting Room in the main office. In an alternative embodiment, regional attorney Clients would work with a Trial Consultant/Technician Operator in the main office from their own computers, connecting via the Internet to the Virtual Scripting Room.

Because the software will have communication capability, remote users could monitor the preparation of the Script via Web browsers such as Internet Explorer or Netscape by logging on to a web site, optionally entering a password, and viewing the Script as the Operator and Clients build it and edit it.

Once Scripting has been completed, a Trial Consultant could provide in-court presentation services. The role of the Trial Consultant can be a function of the ability of the software to: (i) create software rather than graphic based "slides" prior to trial containing segments of video, documents and/or graphics; (ii) order the "slides" into a Script paralleling the attorney's examination outline; and (iii) as a result of the "slides" being maintained as a software matrix rather than as a single graphic file, modify existing "slides", randomly access and display any slide within a Script, and incorporate new or revised animations, video deposition segments, live action video, graphics, and document images during trial. The Trial Consultant may also assist in the analysis of evidentiary issues arising in connection with the multimedia presentation of evidence both as a sword (how far to go) and as a shield (when to object to the other side's use of evidence).

In some cases, the regional attorney Client or personnel provided by the Local Provider could do the in-court presentation of scripts. In this scenario, the main office could provide daily supplemental Scripting and support either through a Virtual Scripting Room, or by the now on-site Trial Consultant.

FIG. 4 depicts the use of Distributed Scripting with the assistance of a Local Provider 35 to provide multimedia support services to a trial team in a remote location. The Clients 36 and 37 are working with an Operator 38 (trial consultant or technician) to script a multimedia presentation in the Virtual Scripting Room. Once again, Client 36, perhaps an expert, is located in his office in the State of Washington, while Client 37 is located in the City of New York. The Operator is located in the Los Angeles Scripting Room. Each of the CPUs of the Clients, perhaps the Local Provider, and the Operator are connected over the Internet (or directly connected via Intranet, fiber optic cable, satellite, ISDN or other high-speed transmission line).

As in FIG. 3, the Operator 38 is utilizing two display devices: a monitor to show script segments, suggested revisions, suggested new segments and notes from the Clients, and another monitor to provide the visual image of the Clients to the Operator via video Tele-conferencing. The Clients are able to view the scripted segments and the work in progress on associated display devices. The Local Provider may act to gather the source data and provide it to the main office either physically or electronically. The Operator is utilizing multimedia software to display a Script and associated data source material from not only her CPU and associated hard drives, but may also utilize remote storage devices 39 such as Internet hard drives. The Scripts and other visual evidence will be displayed to the trier of fact located in a remote courtroom 40, by an in-court Operator 37, by the speaking attorney (not shown), by the Local Provider 35, or even by an Operator 38 located in the main office. Most typically, the main office Operator 38 will electronically transfer a compressed Script and underlying data source material to the in-court Operator 37. For a remote Operator to present evidence in the courtroom, or an Operator located in a courtroom to pull scripted source data from remote hard drives, the courtroom must have telecommunication facilities such as access to the Internet. Alternatively, remote telecommunication devices such as cellular telephones may be used to access the Internet or other communication network.

The communications capability of the software may also permit the broadcast of the presentation over the network (e.g. the Internet) as the presentation is made in court. Thus, attorneys located remotely may track the presentation; the presentation may also be provided to a news service such as CNN for live TV broadcast. The software may also be compatible with Web browsers such as Microsoft Internet Explorer and Netscape, and allow the presentation to be viewed by remote users accessing the Internet through such browsers.

Software

Figure 5A:
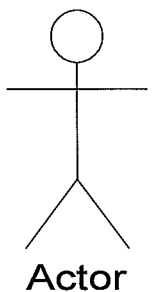
FIGS. 5a-5c represent various system functionality components.

The following subsection presents in greater detail a model of the system functionality as may be implemented in a software package embodying the method and system of the invention. The graphical depictions in this subsection are Use Case diagrams. Use Case diagrams map each user role to the tasks associated with that role and the key software components that service those tasks. They are composed using the following symbols:

Actor—an Actor represents anyone or anything that interacts with the system. An actor is a stick figure; see FIG. 5a.

Figure 5B:
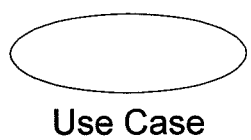

Use Case—a Use Case represents a task or task grouping that the system performs. A Use Case is represented by an oval with text inside describing the task (Edit List) or a group of tasks (List Manager); see FIG. 5b.

Figure 5C:
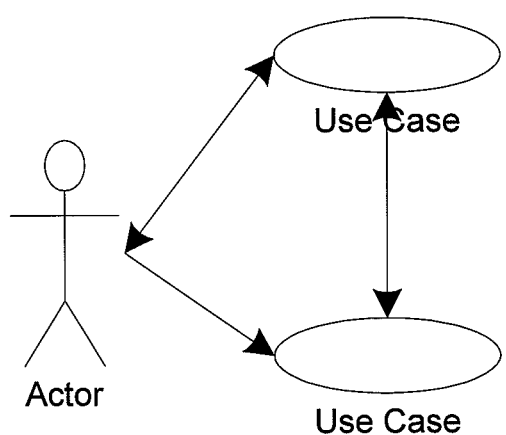

Relationship—A Relationship provides information about how Actors and Use Cases interact with each other. They are depicted as lines with arrowheads. A line with an arrowhead on each end indicates a 2-way communication. A line with an arrowhead on one end indicates that one diagram object is using the one that is pointed to by the arrow; see FIG. 5c.

A common misunderstanding is not differentiating a person's responsibilities from the roles they play in the business. In some businesses, for example, the database administrator, system administrator, and application administrator are different individuals, each of whom has only one role. However, other businesses have a single individual who is responsible for more than one role. Combining the database administrator and application administrator is common, for instance. For a system to be flexible enough to accommodate these differences in operating styles, it should be designed with the assumption that a single individual can perform one or more roles in the system.

Figure 6:
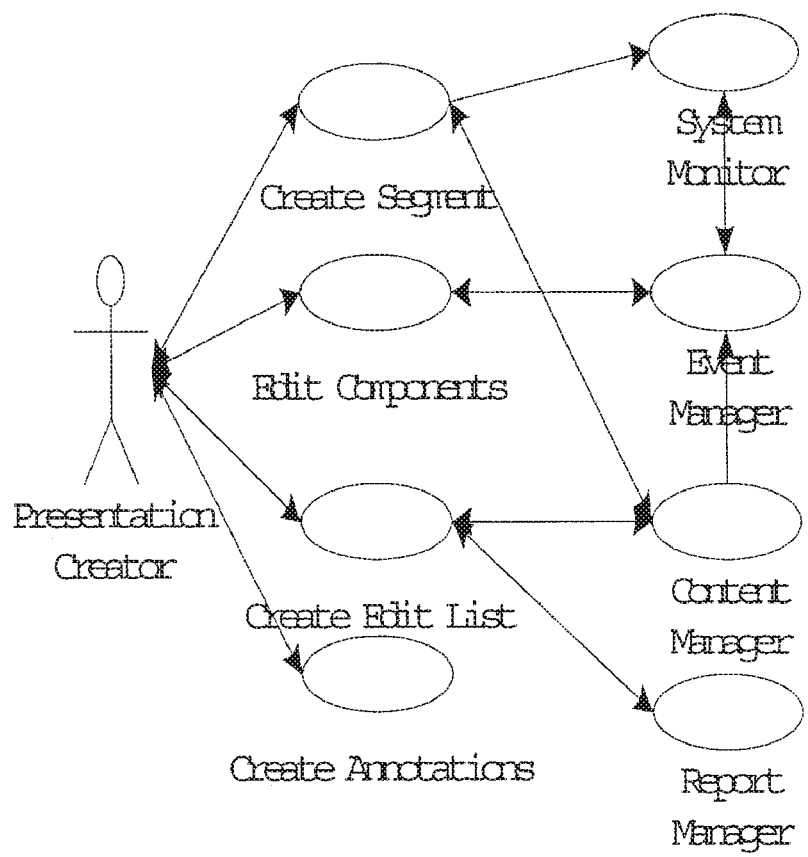
FIG. 6 is a diagram of functions that may be performed by a Presentation Creator in accordance with the invention.
Figure 7:
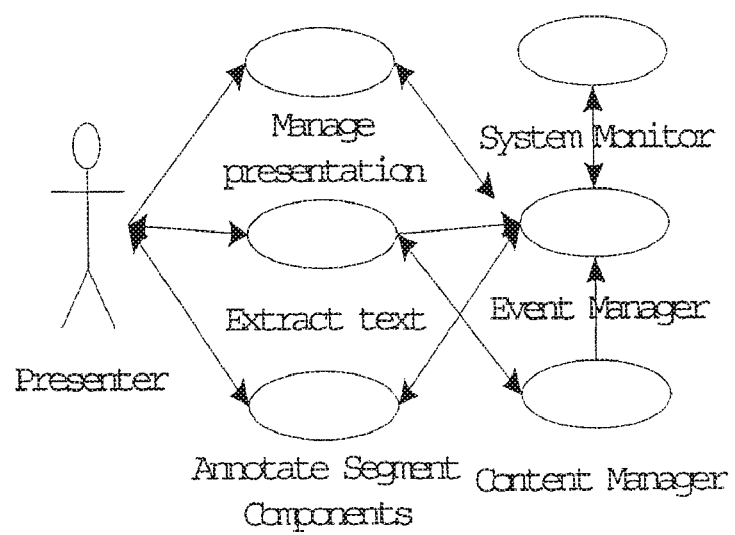
FIG. 7 is a diagram of functions that may be performed by a Presenter in accordance with the invention.
Figure 8:
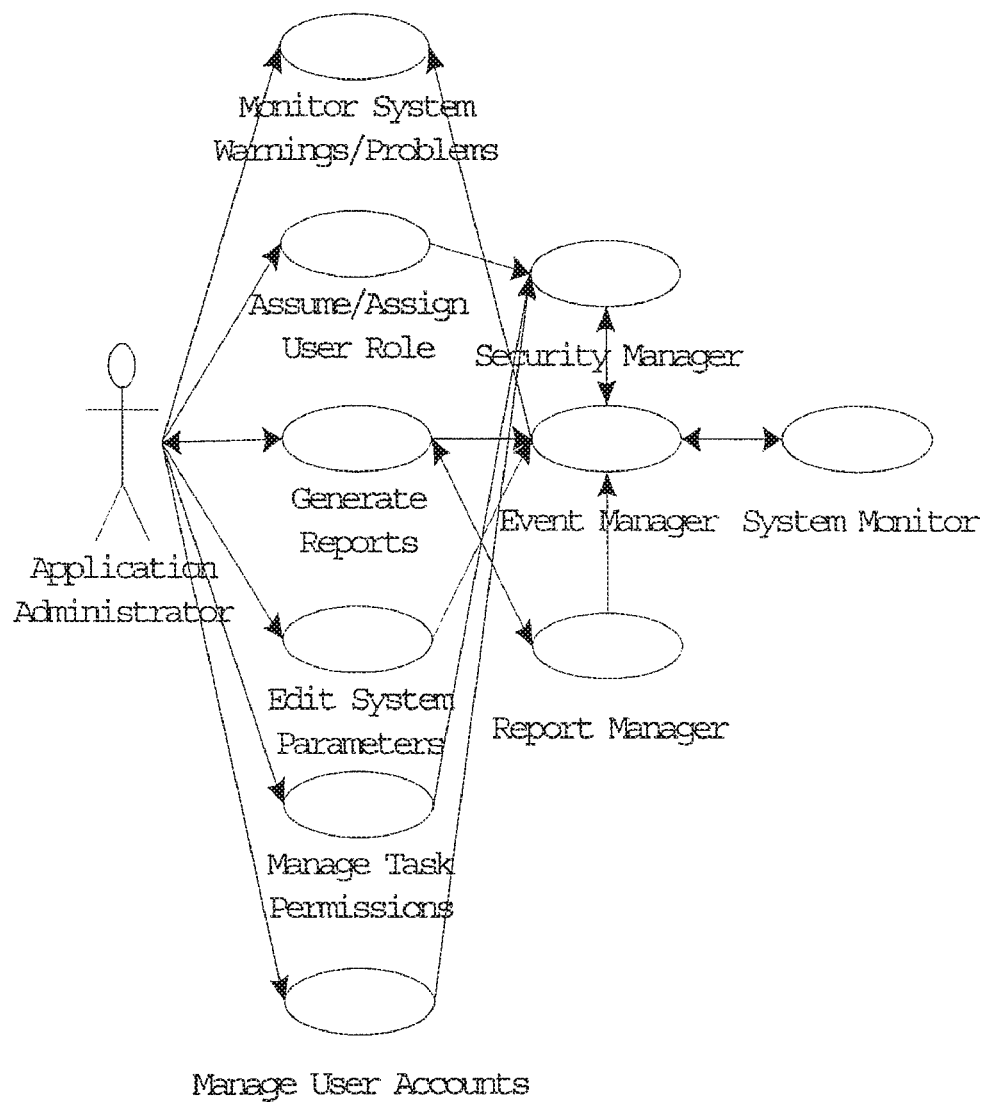
FIG. 8 is a diagram of functions that may be performed by an Application Administrator in accordance with the invention.

The Presentation Creator typically builds the multimedia presentation from components like documents, audio recording, video recording, animations, and pictures, as shown in FIG. 6. The Presenter manages the presentation for the lawyer. Usually the Presentation Creator and the Presenter are the same person, as depicted in FIG. 7. The Application Administrator handles all technical tasks required to install, operate, and fix the application. In order to perform these tasks, in particular the problem resolution tasks, they can temporarily assume any role in the system, as shown in FIG. 8.

Functional Requirements

This subsection describes the functions that may be offered in a preferred software implementation of the system.

The text in a document may be extracted into separate (child) windows ("child" refers to client nomenclature, not object-oriented nomenclature).

The text in a window can be enlarged or diminished in 2-point increments using one button.

The text in a window can be highlighted in color.

The text in a window can be highlighted and underlined in separate colors.

The text in a window can be selected and circled or boxed using precise drawing elements like circles and rectangles.

The text in a window can be selected and marked in the following ways:
strikethrough
highlight
underline The text in a window can be marked by graphical elements like checkmarks and bullets.

The text in a window can be obscured from view.

Freehand drawing can be performed on a text window.

Text can be selected and highlighted while all other text is changed to a different color, for instance, grayed out.

Individual text highlighting can be "undone" or removed without affecting other highlighted text.

Individual text formats like strikethrough, etc. can be "undone" or removed without affecting other text formats.

Individual text edits that obscure text can be "undone" or removed without affecting other obscured (or redacted) text.

Each text edit can be individually removed or undone.

All text highlighting on a segment can be removed with one action.

Individual documents in a segment containing multiple documents can be brought to front with a single keystroke and/or mouse action (mouse roller wheel selection). Repeating the keystroke and/or mouse action cycles through each document, raising to the front in turn.

Documents in a segment can be expanded to full screen.

The system allows the user to page forward and backwards through the document a page at a time. In addition, there must be a way to jump to the beginning and end of the document. Finally, will be a method to jump to a specific page number.

Documents can be rotated by 90 degree angles.

Subsections of pictures can be selected (either with a oval or rectangle) and highlighted.

Subsections of pictures can be selected (either with an oval, or rectangle) and turned opaque.

Subsections of pictures can be selected (either with an oval, or rectangle), extracted into a separate window and blown up.

A picture subsection window can be incrementally magnified or diminished with a single button, one for magnifying and one for decreasing the size of the subsection.

Freehand drawing can be performed on a graphic window.

Pictures in a segment can be expanded to full screen.

Subsections of video can be selected (either with a circle, or rectangle) and highlighted.

Subsections of video can be selected (either with a circle, or rectangle) and extracted and enlarged as a still picture into a separate window.

A video recording can be slowed and sped up incrementally using single user actions for each.

A video recording can be slowed to a stop and then advanced one frame at a time.

When a video recording is being advanced one frame at a time, the full still picture can be captured and extracted to a separate window.

The volume can be controlled on a per video basis. The volume can be set during segment building and controlled during presentation.

The volume can be modulated for a minimum and maximum volume. For instance, a sound below the minimum is increased to the minimum and a sound above the maximum is reduced the maximum.

Multiple marks can be created in a video recording.

A repeating loop can be run between video recording marks.

The video can be set to run to a mark and pause until some action is taken that runs it to the next mark.

The video recording can rewind or fast forward and automatically stop on the first encountered mark.

A video recording(s) can be synchronized with positions in a document(s). That is, when the user clicks a particular section of the document (transcript), the video jumps to the synchronized position in the video recording and vice versa.

A video recording can be synchronized with other video recordings. That is, when the user re-positions in one video, it causes the synchronized video to automatically re-position and stay in sync.

Freehand drawing can be performed on a video window.

Video in a segment can be expanded to full screen.

Full video controls are provided, similar to those found on a VCR.

A segment or set of segments can be cut and pasted into a different script.

Annotations can be created and attached to any segment component.

Segment can be saved using a single action like a keystroke, button, or mouse click.

A script can be merged with another script.

A script can be copied to another script.

A set of segments can be re-ordered in a script.

A set of segments can be extracted and saved as a script.

Each segment has an id reflecting its order in the script.

A "hot save" function for saving a segment along with or without its association. For example, it would be named "HS3_filename".

The "hot save" function will put the saved segment at the end of the segment list in script.

Need to pull and work with, in presentation mode, elements that not part of the script or segment. File select needs to be unobtrusive.

Saving process in script mode needs to be simplified. Needs a hot key to save all segments and the script.

Need to have full segment edit capabilities in presentation mode.

Be able to show segments in script order or select and display on the fly.

Need small segment id on screen for the current segment.

While playing video, The system may provide the ability to have scripted documents show up at specific, timed points in the video.

The system may allow the user to create document scrolling in synchronization with video.

The system may print scripts.

The system may print individual or selected or all segments.

The system may print a slide show format of the segments in a script (proof sheet).

The system may print a slide show w/barcodes (proof sheet w/barcodes).

The system may print segment components.

The system may print a segment description-barcode cross-reference.

The system may print a barcode-file name cross-reference within a specified directory.

The user can select which files will be included in the cross-reference.

Saving a segment containing multiple elements retains the dominance (i.e. which document is in front) seen on the screen.

An element's size can be set individually within a segment.

The software will preferably be able to interface with a wide variety of other software, e.g. word processors (MS Word, WordPerfect, etc.), presentation software (Power Point, etc.), databases (Oracle, Dbase, etc.), case management software (Summation, etc.), video preparation and editing software (e.g. QuickTime), image preparation and editing software (e.g. Photoshop), and others. The software may convert certain files into a preferred format (e.g. convert all Word files into RTF format) and save them in this preferred format. However, the software will ideally also be able to read and display any format on-the-fly.

This function will enable the Presenter to incorporate new components into a segment at a moment's notice even if the new components are located remotely and are not available on the CPU running the Script in court. In this manner, the invention allows the Presenter to access new information located anywhere in the world, provided that the information is accessible remotely (e.g. stored on servers connected to the Internet), and incorporate the information into the presentation Script as may be required by new and unanticipated developments.

Potential Uses and Markets

Other services may be provided in addition to the in-court presentation of evidence via the method and system of the invention. Such additional services may be further aided by the addition of two supplemental software features, as described below.

1) Interactive Text Objects

This feature may take the form of an utility that permits a form or other text document to be treated as a scripting object in a fashion similar to other data source material, with the exception that the Operator may at any time add text to the form and save both the form and the new text in a script segment together with other objects (graphics, photographs, etc). This utility may be used in the medical and insurance fields, for instance, where a physician in a medical testing facility could in the course of evaluating an Ultra Sound or NMR image complete an electronic medical evaluation/diagnosis form and script the image and completed form together in a single script segment. In this situation, the Script represents a patient's medical file rather than a witness examination. The patient Script could be maintained by the main office in the role of the Operator, while the testing facility physician, the treating physician, the specialist (surgeon) and the hospital would each have the role of a Client. The resulting Script may be transmitted to other facilities for viewing, diagnosis, patient treatment, or for billing and insurance reimbursement.

2) Distributed Presentation

Ultimately a Script, whether created in a physical or virtual scripting room, may be presented either: (a) to an audience physically in the presence of the Operator, as in the case of a jury in a courtroom where a lawyer is presenting evidence with assistance of an Operator; or (b) to an audience connected to the Operator over the Internet (or directly connected via Intranet, fiber optic cable, satellite, ISDN or other transmission line; "Distributed Presentation"), as in the case of Internet based marketing—e.g. the Victoria's Secret fashion shows, General Motors introduction of new car models, or the latest Microsoft software introduction. The audience may be a single individual, a group of individuals sitting together or a geographically distributed group located throughout the world.

Each of the following examples may utilize Distributed Scripting and/or Distributed Presentation.

Insurance Claim Processing and Reimbursement—The Script is the claim file; the Clients are the claim adjuster, the investigators, repair or replacement sources, the claims manager and the payer; the Operator is either the Insurance Company or the main office.

Medical Diagnostic and Payment—The Script is the patient file; the Clients are the testing facility physician, the treating physician, the specialist (surgeon), the hospital and ultimately the insurer; the Operator is the main office.

Corporate Presentations and Marketing—The Script is the presentation topic; the Clients are the internal team members responsible for the project, external consultants and in some cases the audience; the Operator is the corporation.

Development of Corporate Collateral and Marketing—The Script is the assemblage of the corporate collateral being created; the Clients are the in-house marketing personnel, the in-house executive in charge of the project, the senior executive who ultimately approves the project, the external marketing/advertising executive in charge of the project, the graphic designers; the Operator is either the corporation or the marketing entity.

Advertising Graphic Development and Delivery—The Script is the advertising campaign being created; the Clients are the in-house marketing personnel, the in-house executive in charge of the project, the senior executive who ultimately approves the project, the external advertising executive in charge of the project, the graphic designers and other team members; the Operator is the advertising company.

Corporate Road Shows—The Script is the offering materials, Company history and prospects; the Clients are the senior management of the corporation, the auditors, the investment bankers and attorneys; the Operator is either the lead investment bank or the main office.

Internet Conferencing—The Script is the presentation topic; the Clients are the internal team members responsible for the project, external consultants and in some cases the audience; the Operator is either the Web hosting corporation, or the main office.

Project Development and Oversight: Architecture, Construction and Finance—The Script is the project, including the development contract, the finance contract, and the plans, progress reports and testing; the Clients are the financing entity, the architects, subcontractors, the general contractor and inspectors; the Operator is the owner/buyer.

Banking: Finance Packages and Loan Processing—The Script is the borrower and the loan package; the Clients are the borrower, the loan officer, the approval committee; the Operator is the Bank or lending institution.

Aircraft, Satellite and Space Craft Construction Management and Reporting—The Script is the individual aircraft, satellite or space craft, including the development contract, the finance contract, and the plans, progress reports and testing; the Clients are the financing entity, the architects, subcontractors, the manufacturer, the construction managers, safety inspectors and regulatory agencies; the Operator is the owner/buyer.

Shipbuilding—The Script is the vessel, including the construction contract, the finance contract, and the plans, progress reports and testing; the Clients are the financing entity, the architects, subcontractors, the builder, the project manager, safety inspectors and certification societies; the Operator is the owner/buyer.

Focus Group Results—The Script is the research results, statistical charts and conclusions; the Clients are the researcher and/or the facilitator, the entity paying for the study; the audience are the financial backers of the study, the studio executives, in the case of a movie, the product line executives, in the case of a new product release; the Operator is either the entity putting on the research or the main office.

Focus Group Results: Litigation—The Script is the research results, statistical charts, case themes and conclusions; the Clients are the Jury consultant, the facilitator, the attorneys on the trial team involved in the litigation; the audience are the trial team members, the client party to the litigation and/or the client representative; the Operator is either the jury consulting firm or the main office.

Having now described the invention in accordance with the requirements of the patent statutes, those skilled in this art will understand how to make changes and modifications in the present invention to meet their specific requirements or conditions. Such changes and modifications may be made without departing from the scope and spirit of the invention as set forth in the following claims.

What is claimed is:

1. A method for providing a multimedia presentation, said method comprising:
   presenting a draft multimedia script via a network to a plurality of contributors, the draft multimedia script including one or more software based slides, for collaboration to develop a multimedia presentation;
   displaying changes to the draft multimedia script, proposed by any of the plurality of contributors, in real time to the plurality of contributors;
   accepting input, in real time, received from any of the plurality of contributors concerning a particular proposed change, for display to the plurality of contributors;
   selectively revising the draft multimedia script at least under the control of an operator to include the particular proposed change after the input concerning the particular proposed change has been reviewed by at least some of the plurality of contributors to create a revised multimedia script; and
   organizing a presentation of the multimedia presentation based on the revised multimedia script.

2. The method of claim 1 wherein presenting includes enabling communication among the contributors and the operator at least during collaboration to develop the multimedia presentation.

3. The method of claim 1, further comprising:
   displaying proposed changes to the draft multimedia script proposed by a remotely located time shifted contributor at a different time.

4. The method of claim 1, further comprising:
   displaying proposed revisions to the draft multimedia script and automatically saving the proposed revisions within the draft multimedia script as temporary script segments.

5. The method of claim 4 wherein saving the proposed revisions includes identifying each proposed revision with a creator and revision number.

6. The method of claim 4, further comprising:
   finalizing one of the proposed revisions as part of the draft multimedia script only in response to an acceptance by at least one of the operator and one or more designated contributors.

7. The method of claim 1 further comprising:
   maintaining each slide as a software matrix.

8. The method of claim 1 wherein selectively revising includes at least one of modifying an existing script slide, creating a new script slide, and appending comments to at least one scripted slide.

9. The method of claim 1 wherein at least one or more contributors selectively modify the script and said method further comprises automatically saving the actions of each such contributor in association therewith for later recall.

10. The method of claim 9 wherein saving includes storing the actions of each contributor in a log file wherein each action is identifiable to one of the contributors.

11. The method of claim 1 further comprising:
    monitoring the preparation of the draft multimedia script via a web browser accessed by a remote user.

12. The method of claim 11 wherein monitoring includes logging onto a web site and viewing the draft multimedia script.

13. The method of claim 1 further comprising saving a copy of the draft multimedia script as a working copy responsive to a contributor choosing to work independently.

14. The method of claim 13 further comprising:
    modifying the working copy responsive to the independently working contributor.

15. The method of claim 13 further comprising:
    submitting the working copy to other contributors and the operator for potential incorporation into the revised multimedia script.

16. The method of claim 1 further comprising:
    broadcasting the multimedia presentation over the Internet.

17. The method of claim 1 further comprising:
    accepting concurrent contributions to the revised multimedia script from the plurality of contributors with at least one contributor at a different physical location.

18. The method of claim 1 further comprising saving the multimedia script responsive to an interaction with the operator.

19. The method of claim 18 wherein saving saves the multimedia script on an operator computer under control of said operator.

20. The method of claim 18 wherein saving saves the multimedia script on at least one Internet based repository.

21. The method of claim 1 further comprising:
    displaying the multimedia presentation to an audience via one of the Internet, a direct intranet connection, fiber optic cable, satellite or ISDN.

22. The method of claim 1 further comprising:
    displaying the multimedia presentation to an audience over the Internet on a remote telecommunications device.

23. The method of claim 1 wherein at least some of said contributors simultaneously edit the draft multimedia script.

24. The method of claim 1 wherein each contributor is enabled to modify existing slides, create new slides and append comments to any scripted slide.

25. The method of claim 1 wherein a privilege of the operator to accept and reject proposed changes by the contributors is selectively conferrable upon at least one of the contributors by the operator.

26. The method of claim 1 further comprising;
    saving the multimedia script on at least one Internet based repository.

27. The method of claim 1 further comprising:
    editing at least one software based slide of the revised multimedia script during the multimedia presentation.

28. The method of claim 1 wherein at least one software based slide contains at least one data source element to display underlying data source material of the data source element at least as part of at least one software based slide during presenting the draft multimedia script and said method includes accessing the underlying data on-the-fly without opening another software application that is associated with the underlying data.

29. The method of claim 1 wherein at least one software based slide includes at least one of an audio recording, a video recording, and a live action video stream.

30. The method of claim 1 wherein the network is the Internet.

31. The method of claim 1 wherein at least one of said contributors accesses the Internet, serving as said network, via a remote telecommunications device.

32. A method for creating a multimedia presentation using a network, said method comprising:
presenting a draft multimedia script via the network to a plurality of contributors for collaboration to develop a multimedia presentation, at least one of the contributors being located at a location remote from an operator, the draft multimedia script including one or more software based slides;
displaying changes to the draft multimedia script, proposed by any of the plurality of contributors, in real time to all of the plurality of contributors and to the operator;
accepting input, in real time, received from any of the plurality of contributors concerning a particular proposed change, for display to all of the plurality of contributors;
selectively revising the draft multimedia script at least under the control of the operator to include the particular proposed change after the input concerning the particular proposed change has been reviewed by at least some of the plurality of contributors and the operator to create a revised multimedia script; and
organizing a presentation of the multimedia presentation based on the revised multimedia script.

33. The method of claim 32 wherein a privilege of the scripting controller to accept and reject proposed changes by the contributors is selectively conferrable upon at least one of the contributors by the operator.

34. The method of claim 33 further comprising:
saving the multimedia script on at least one Internet based repository.

35. The method of claim 32 further comprising:
broadcasting the multimedia presentation over the Internet.

36. The method of claim 32 further comprising:
accepting concurrent contributions to the revised multimedia script from the plurality of contributors with at least some contributors at different physical locations.

37. The method of claim 32 further comprising:
saving the draft multimedia script responsive to an interaction with at least one of the contributors.

38. The method of claim 37 wherein saving saves the multimedia script on the operator computer.

39. The method of claim 32 wherein at least one software based slide includes at least one of an audio recording, a video recording, and a live action video stream.

40. The method of claim 32 wherein the network is the Internet.

41. The method of claim 32 wherein at least some of one contributor accesses the Internet, serving as said network, via a remote telecommunications device.

42. The method of claim 37 wherein saving saves the multimedia script on at least one Internet based repository.

43. One or more computer readable media that are non-transitory and that store a program, wherein the program, when executed, instructs a computer to perform the following operations to provide a multimedia presentation:
present a draft multimedia script via a network to a plurality of contributors, the draft multimedia script including one or more software based slides, for collaboration to develop a multimedia presentation;
display changes to the draft multimedia script, proposed by any of the plurality of contributors, in real time to the plurality of contributors;
accept input, in real time, received from any of the plurality of contributors concerning a particular proposed change, for display to the plurality of contributors;
selectively revise the draft multimedia script at least under the control of an operator of the computer to include the particular proposed change after the input concerning the particular proposed change has been reviewed by at least some of the plurality of contributors to create a revised multimedia script; and
organize a presentation of the multimedia presentation based on the revised multimedia script.

44. One or more computer readable media that are non-transitory and that store a program, wherein the program, when executed, instructs a computer to perform the following operations to create a multimedia presentation using a network:
present a draft multimedia script from the computer via the network to a plurality of contributors for collaboration to develop a multimedia presentation, at least one of the contributors being located at a location remote from an operator of the computer, the draft multimedia script including one or more software based slides;
display changes to the draft multimedia script, proposed by any of the plurality of contributors, in real time to all of the plurality of contributors and to the operator;
accept input, in real time, received from any of the plurality of contributors concerning a particular proposed change, for display to all of the plurality of contributors;
selectively revising the draft multimedia script at least under the control of the operator to include the particular proposed change after the input concerning the particular proposed change has been reviewed by at least some of the plurality of contributors and the operator to create a revised multimedia script; and
organize a presentation of the multimedia presentation based on the revised multimedia script.

45. A system for producing a multimedia presentation, said system comprising:
a controller computer including at least one processor for presenting a draft multimedia script via a network to a plurality of contributors, the draft multimedia script including one or more software based slides, for collaboration to develop a multimedia presentation; and
a display device for each contributor to display changes to the draft multimedia script, proposed by any of the plurality of contributors, in real time to the plurality of contributors;
non-transitory computer readable media having encoded thereon computer software comprising a set of instructions executable by the at least one processor to:

accept input, in real time, received from any of the plurality of contributors concerning a particular proposed change, for display to the plurality of contributors, selectively revise the draft multimedia script at least under the control of an operator to include the particular proposed change after the input concerning the particular proposed change has been reviewed by at least some of the plurality of contributors to create a revised multimedia script, and organize a presentation of the multimedia presentation based on the revised multimedia script.

* * * * *